(12) United States Patent
Tran et al.

(10) Patent No.: US 9,167,282 B2
(45) Date of Patent: Oct. 20, 2015

(54) ENHANCED HDMI SYSTEM AND METHOD

(75) Inventors: Duke H. Tran, Huntington Beach, CA (US); Shing-Hong Lin, Redondo Beach, CA (US)

(73) Assignee: Broadata Communications, Inc., Torrance, CA (US)

( * ) Notice: Subject to any disclaimer, the term of this patent is extended or adjusted under 35 U.S.C. 154(b) by 506 days.

(21) Appl. No.: 13/221,095

(22) Filed: Aug. 30, 2011

(65) Prior Publication Data

US 2013/0050582 A1  Feb. 28, 2013

(51) Int. Cl.
*H04N 21/236* (2011.01)
*G06F 13/00* (2006.01)
*H04N 21/4363* (2011.01)
*H04N 21/434* (2011.01)

(52) U.S. Cl.
CPC ..... *H04N 21/23614* (2013.01); *H04N 21/4348* (2013.01); *H04N 21/43635* (2013.01)

(58) Field of Classification Search
None
See application file for complete search history.

(56) References Cited

U.S. PATENT DOCUMENTS

| | | | |
|---|---|---|---|
| 2006/0212911 A1* | 9/2006 | MacMullan et al. | 725/81 |
| 2007/0220150 A1* | 9/2007 | Garg | 710/38 |
| 2008/0007616 A1* | 1/2008 | Baladhandayuthapani | 348/14.12 |
| 2009/0015723 A1* | 1/2009 | Doumuki | 348/725 |
| 2012/0047281 A1* | 2/2012 | Lee et al. | 709/231 |
| 2012/0133750 A1* | 5/2012 | Talbert et al. | 348/65 |
| 2012/0173769 A1* | 7/2012 | Loo | 710/14 |
| 2012/0191894 A1* | 7/2012 | Sasaki et al. | 710/313 |
| 2012/0281860 A1* | 11/2012 | He et al. | 381/107 |

* cited by examiner

*Primary Examiner* — Idriss N Alrobaye
*Assistant Examiner* — Dayton Lewis-Taylor
(74) *Attorney, Agent, or Firm* — Sheppard, Mullin, Richter & Hampton LLP

(57) ABSTRACT

A multiplexer includes a first interface configured to receive one or more HDMI or DVI signals for transmission over a respective one of an HDMI or DVI interface; a second interface configured to receive external data from a data source, the external data being intended for transmission over the HDMI or DVI interface; a data multiplexing device having inputs coupled to the first and second interfaces, and having an output, and being configured to multiplex the external data with information on one or more signal paths of the HDMI or DVI interface; and a transmitter coupled to the output of the data multiplexing device, configured to transmit the external data across the HDMI or DVI interface.

27 Claims, 7 Drawing Sheets

ENHANCED HDMI SYSTEM AND METHOD

TECHNICAL FIELD

The present invention relates generally to communication links, and more particularly, some embodiments relate to communication of data and other information across a high-definition video interface.

DESCRIPTION OF THE RELATED ART

Digital Visual Interface (DVI) became rapidly popularized across the digital consumer market in about the 2003 timeframe. It became popular for uses including DTVs, high definition set-top boxes and computer graphics boards. By the end of that year, hundreds of different consumer electronics products included a DVI connection, including the vast majority of DTVs.

In the same timeframe, the now popular HDMI (High-Definition Multimedia Interface) standard was evolving. The HDMI working group began working on HDMI 1.0 on Apr. 16, 2002, to develop the HDMI digital interface specification for consumer electronics products. Their goal was to create an AV connector that was backward-compatible with DVI. Shortly, HDMI emerged as an alternative communications interface for digital transmission of content. HDMI was capable of handling both uncompressed high definition video (with support for SDTV and HDTV color spaces) as well as other multi-channel audio formats. HDMI could even handle device control data using the multiconductor cable with a single connector head. One advantage of HDMI is the ability to allow connected devices to 'recognize' each other and determine a connected device's resolution and formats.

There are five HDMI connector types, described as Types A-E. Types A and B are specified in the HDMI 1.0 specification; type C is specified in the HDMI 1.3 specification; and types D and E are specified in the HDMI 1.4 specification. Type A has nineteen pins, and has sufficient bandwidth to support all SDTV, EDTV and HDTV modes. Type B supports twice the video bandwidth of type A, and is therefore suitable for use with high-resolution displays. Type A is electrically compatible with single-link DVI-D, while Type B is electrically compatible with dual-link DVI-D.

Type C, defined in the HDMI 1.3 specification, has the same 19-pin configuration as Type A, but is smaller and is intended for portable devices. Type D is a micro connector defined in the HDMI 1.4 specification. It uses the standard 19 pins of types A and C but is sized along the lines of a micro-USB connector. Type E is also defined in HDMI 1.4 specification, but is intended for automotive uses.

HDMI specifies signal paths for video and video-related data for audio and video content, including digital links Red, Green and Blue video data, clock and left and right audio data. In addition, HDMI has two communication channels for other video-related data: the DDC (Display Data Channel), and CEC (Consumer Electronics Control) channels. The Display Data Channel (DDC) supports the Enhanced Display Data Channel (E-DDC). This channel is used by the HDMI source device to read the E-EDID data from the HDMI sink device to learn what audio/video formats it supports. The DDC is based on the $I^2C$ standard and allows support for fast mode speed at 400 kbps.

The Consumer Electronics Control (CEC) allows the user to command and control two or more CEC-enabled devices that are connected through HDMI using only one of the devices' remote controls. CEC also allows CEC-enabled devices to command and control other CEC-enabled devices without user intervention. The CEC is a one-wire bidirectional serial bus that uses the AV.link protocol.

The video, audio and auxiliary data are carried via Transition Minimized Differential Signaling (TMDS) in one of three modes, called the Video Data Period, the Data Island Period and the Control Period. During the Video Data Period, the pixels of an active video line are transmitted. During the Data Island period (which occurs during the horizontal and vertical blanking intervals), audio and auxiliary data are transmitted in a packetized format. The Control Period occurs between Video and Data Island periods. Both HDMI and DVI use TMDS to send 10-bit characters. The characters are encoded using 8b/10b encoding for the video data period and 2b/10b for the control period. HDMI adds the ability to send audio and auxiliary data for the data island period. DVI does not have the ability to send audio during the blanking intervals, nor does it have the CEC capability of the HDMI.

Various standards also exist for data communications among a plurality of devices. For example, RS-232 (Recommended Standard 232) refers to standardized communications between a DTE (Data Terminal Equipment) and a DCE (Data Circuit-terminating Equipment). A common application of RS-232 is in computer serial ports. The standard defines the electrical characteristics and timing of signals, the meaning of signals, and the physical size and pin-out of connectors.

When is it is desired to share AV content as well as data between a plurality of devices, multiple connections are conventionally required. For example, HDMI or DVI connections may be used to share audio and video content between two devices, but if it is desired to share data between the devices as well, a separate connection, such as an RS-232 or other data connection, is required.

BRIEF SUMMARY OF EMBODIMENTS OF THE INVENTION

According to various embodiments of the invention a multiplexer is provided for communicating external data between devices across a video interface. In some embodiments, the multiplexer includes a first input to receive video or video-related data from a first video device; a second input to receive the external data for transmission across the video interface; and control logic configured to inject the external data onto the video interface for transmission across the video interface.

In one example embodiment, the control logic comprises a controller and switching logic, wherein the controller is configured to detect an idle condition on the video interface and to control the switching logic. By way of further example, the controller controlling the switching logic comprises instructing the switching logic to switch the external data onto the video interface during a detected idle condition. In another embodiment, the controller is further configured to monitor the video interface for the presence of external data from a device across the video interface and to control the switching logic to extract sensed external data from the device across the video interface.

In another example embodiment the control logic includes a modulator, wherein the modulator is configured to modulate the external data onto the video interface. In further embodiments, the control logic includes a demodulator, wherein the demodulator is configured to extract external data from the video interface.

In a further example embodiment, a video system is provided for communicating video and video-related data, in which the system includes a first video device configured to send video or video-related data across a video interface; a second video device configured to receive the video or video-related data sent by the first device across the video interface; a third device configured to communicate external data; a multiplexer coupled to the video interface and coupled to the third device. In various embodiments, The multiplexer can include a first input to receive the video or video-related data from a the first video device; a second input to receive the external data from the third device for transmission across the video interface; and control logic configured to inject the external data onto the video interface for transmission across the video interface.

In one example embodiment, the control logic comprises a controller and switching logic, wherein the controller is configured to detect an idle condition on the video interface and to control the switching logic. By way of further example, the controller controlling the switching logic comprises instructing the switching logic to switch the external data onto the video interface during a detected idle condition. In another embodiment, the controller is further configured to monitor the video interface for the presence of external data from a device across the video interface and to control the switching logic to extract sensed external data from the device across the video interface.

In another example embodiment the control logic includes a modulator, wherein the modulator is configured to modulate the external data onto the video interface. In further embodiments, the control logic includes a demodulator, wherein the demodulator is configured to extract external data from the video interface.

In various embodiments, the third device can be integrated with the first or second device, or it can be a separate device. Accordingly, the third device can be a module or other subsystem or component within either or both of the first or second devices. Accordingly, the external data may be data from external to the device with which the third device is integrated, or it may be data from that device. Typically, external data would be non-video data or other data that would otherwise not normally be transferred across the video interface.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward a system and method for transmitting data over an HDMI, DVI or other video interface. In some embodiments, a video interface, such as an HDMI or DVI interface used to transmit audio and video data from a source device to a sink device is also used to communicate additional data or information between the devices. In some embodiments, data, such as, for example, low-bit-rate RS-232 data, is combined with information on the DDC of the HDMI, DVI or other video interface for communication between the source and sink devices. In other embodiments, data, such as, for example, low-bit-rate RS-232 data, is embedded on the Hot Plug Detect (HPD) signal line for communication between the source and sink devices. In still further embodiments, data, such as, for example, low-bit-rate RS-232 data, is embedded with the HDMI video stream for communication between the source and sink devices. Although the systems and methods described herein are described at times in terms of low-bit-rate RS-232 data, after reading this description, one of ordinary skill in the art will recognize that these systems and methods can be implemented with other data protocols or formats. Likewise, although the systems and methods described herein are described at times in terms of HDMI or DVI video interfaces, one of ordinary skill in the art will recognize that these systems and methods can be implemented with other interface specifications.

Figure 1:
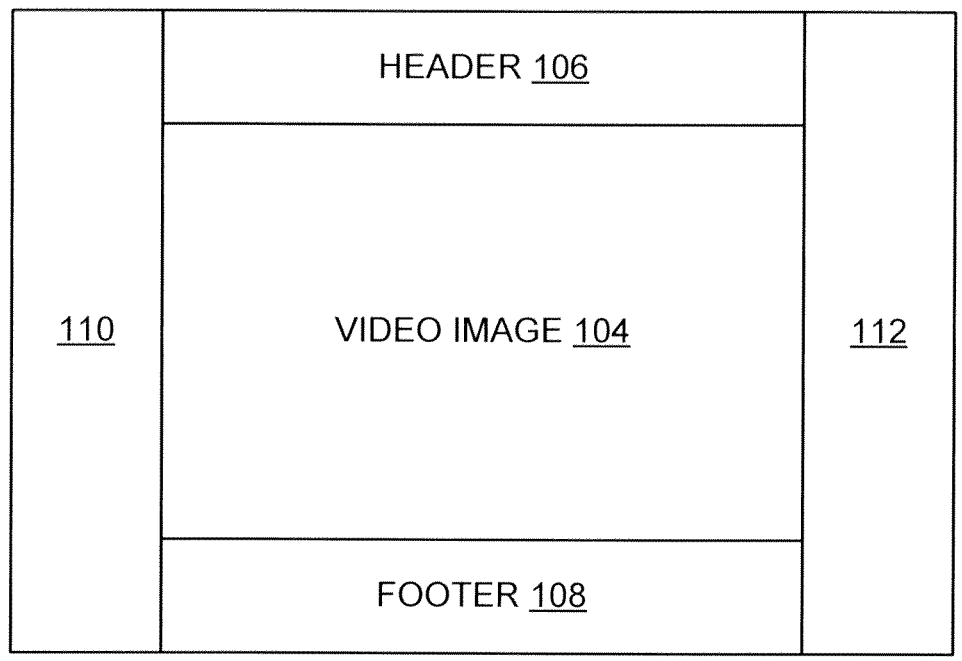
FIG. 1 is a diagram illustrating an HDMI video frame in accordance with one embodiment of the systems and methods described herein.

As noted above, in some embodiments, data, such as, for example, low-bit-rate RS-232 data, is embedded with the HDMI or DVI video stream for communication between the source and sink devices. For example, data to be communicated across the HDMI interface can be embedded in the blanking portion of the HDMI video signal. FIG. 1 is a diagram illustrating an HDMI video frame in accordance with one embodiment of the systems and methods described herein. In the illustrated example, video portion 104 includes the video image to be displayed or stored at the sink device. The video image includes horizontal lines of video image data, such as, for example, HD image data. Also shown as part of this conventional HDMI video frame are a header 106, footer 108 and blanking portions 110, 112. Blanking portions, 110, 112 are the areas in which the program content audio data is embedded and transmitted to the sink device. In some embodiments, data (e.g., RS-232 data) is encoded in either or both blanking portions 110, 112 for transmission. In various embodiments, data can be encoded into the header 106 or footer 108 portions of the video frame as well.

Figure 2:
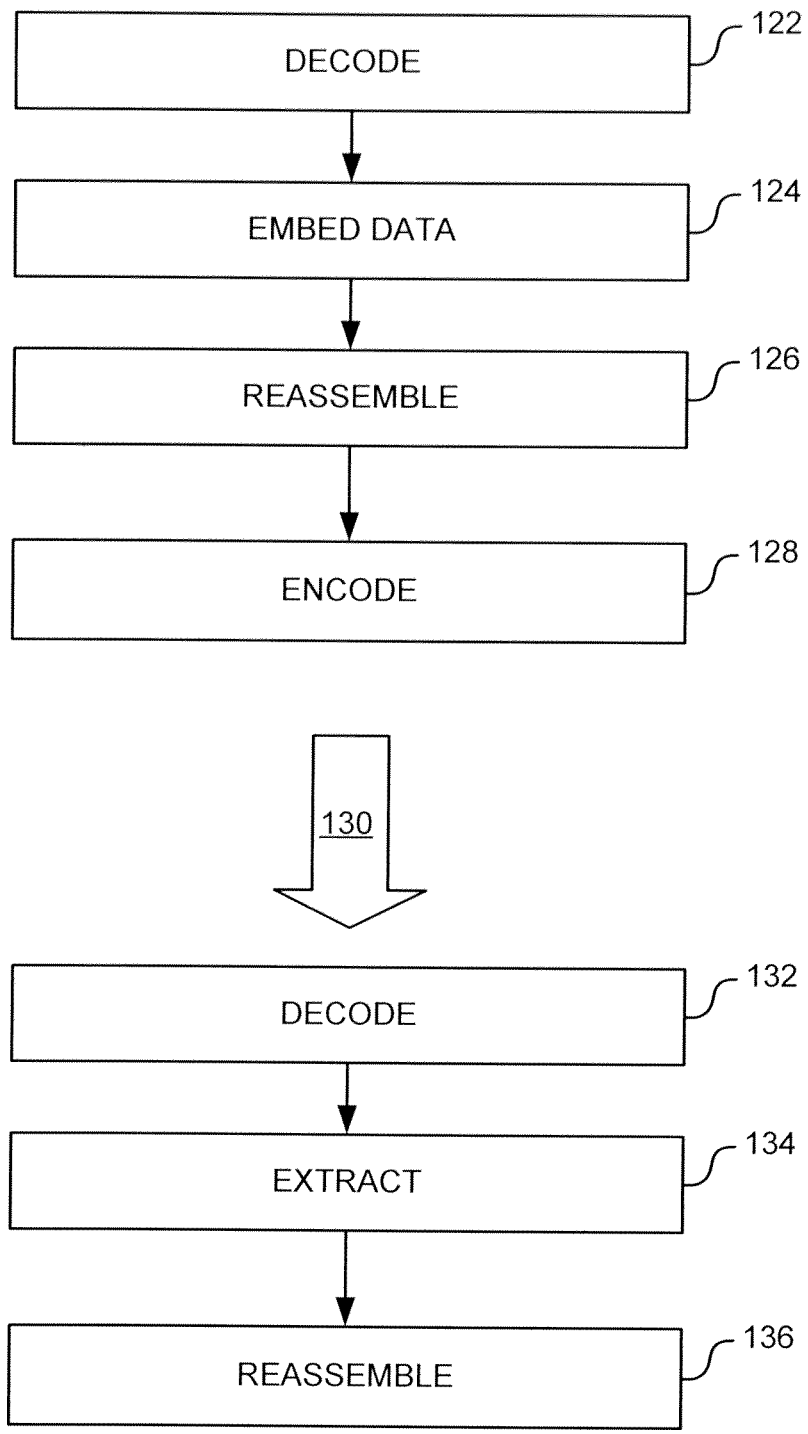
FIG. 2 is a diagram illustrating an example process for embedding data into an HDMI video stream in accordance with one embodiment of the systems and methods described herein.

FIG. 2 is a diagram illustrating an example process for embedding data into an HDMI video stream in accordance with one embodiment of the systems and methods described herein. Referring now to FIG. 2, in a step 122, the HDMI video data is decoded and its constituent parts are identified. For example, in terms of the HDMI video frame of FIG. 1, the HDMI video data constituent portions, video image 104, header 106, footer 108 and blanking 110, 112 portions are identified. In a step 124, the data to be transmitted is embedded into the video data. For example, in some embodiments, the data to be transmitted is embedding into either or both blanking portions 110, 112. After the data is embedded, the video frame is reassembled in step 126 and encoded in step 128 for transmission 130.

At the receiving device (e.g., the sink device), the HDMI frame is decoded at step 132. The embedded data is extracted from the frame at step 134. At step 136, the HDMI frame is reassembled for display or storage at the sink device.

Figure 3:
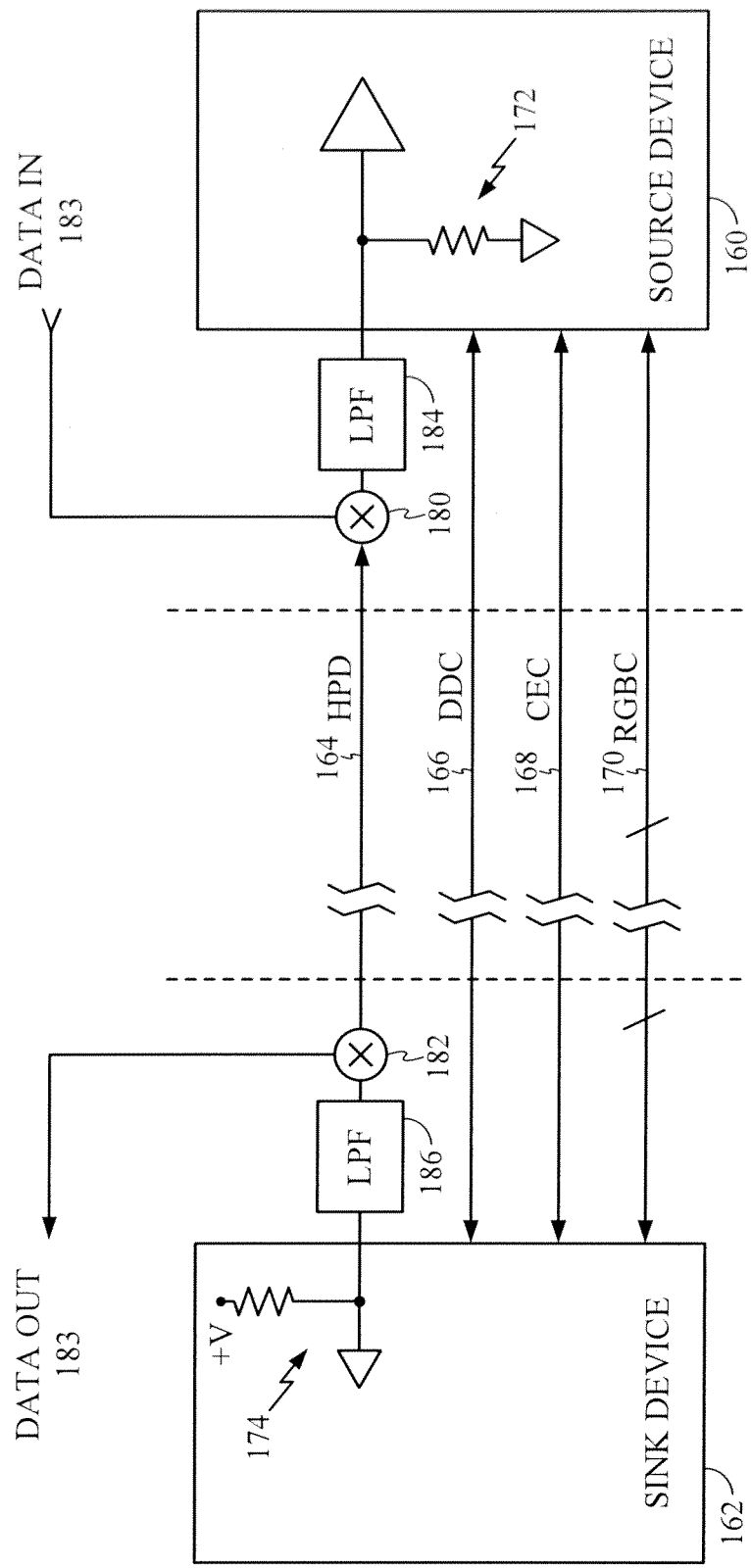
FIG. 3 is a diagram illustrating a system for transmitting data across the Hot Plug Detect signal line for communication between the source and sink devices in accordance with one embodiment of the systems and methods described herein.

As stated above, in some embodiments, data, such as, for example, low-bit-rate RS-232 data, is embedded on the Hot Plug Detect (HPD) signal line for communication between the source and sink devices. An example configuration for such embodiments is now described. FIG. 3 is a diagram illustrating a system for transmitting data across the Hot Plug Detect signal line for communication between the source and sink devices in accordance with one embodiment of the systems and methods described herein. Referring now to FIG. 3, the example shows a source device 160 communicating with a sink device 162 over an HDMI interface. RGB video data and the associated clock are sent over interface lines 170. As noted above, with conventional HDMI protocols, audio data is embedded with the RGB data and sent over signal lines 170 as well.

The Consumer Electronics Control (CEC) 168 allows the user to command and control multiple CEC-enabled devices that are connected through HDMI using only one of the devices' remote controls. CEC 168 also allows CEC-enabled devices to command and control other CEC-enabled devices without user intervention. The CEC 168 is a one-wire bidirectional serial bus that uses the AV.link protocol.

The Display Data Channel (DDC) 166 supports the Enhanced Display Data Channel (E-DDC). This channel is used by the HDMI source device 160 to read the E-EDID data from the HDMI sink device 162 to learn what audio/video formats it supports. The DDC is based on the standard and allows support for fast mode speed at 400 kbit/s.

The HPD (Hot Plug Detection) 164 allows the source device 160 to detect a connected sink device 162. As illustrated, within a source device 160, the HPD line 164 is pulled to a low value by pull-down resistor 172. When the line is open and no device is connected, the source device 160 sees a logic level "low" at HPD 164, indicating that no device is detected. The sink device 162, includes a pull-up resistor 174 connected to a positive voltage supply. Accordingly, when sink device 162 is connected to source device 160, the source device 160 sees a logic level "high" indicated that a device is connected.

In the illustrated embodiment, data (for example, RS-232-type data) is multiplexed onto and sent over HPD signal line 164. Particularly, the illustrated example shows a multiplexer 180 and demultiplexer 182. Multiplexer 180 is configured to multiplex data 183 onto HPD signal line 164. For example, in one embodiment, multiplexer 180 may be a modulator, such as, for example, a multiplier that multiplies the data 183 with the signal level on HPD signal line 164 to modulate the data onto signal line 164. In another embodiment, multiplexer may be time division multiplexer that effectively switches the data 183 onto the line in bursts short enough so as not to interfere with the HPD function. A demultiplexer 182 is provided at the receive end to extract the data 183 from HPD signal line 164.

The example illustrated in FIG. 3 shows an example of data 183 being transmitted from source device 160 to sink device 162. In some embodiments, data 183 can be sent from a sink device 162 to source device 160, while in other embodiments, the data transfer can be bi-directional. For the case of bi-directional data transfer, a multiplexer/demultiplexer can be provided at both ends of the communication channel.

Also shown in FIG. 3 is a low-pass filter 184 to filter any data 183 out from the HPD signal line 164 so that it does not interfere with the detection of the connection of a sink device 162. Likewise, low-pass filter 186 may be provided to filter out any data 183 from the signal line 164 at sink device 162. With proper low-pass filtering, the data will not interfere with the detection function of the HPD. In some embodiments, the HPD function can be gated to require a the signal on HPD 164 to be Low or High for a minimum amount of time to determine whether or not a device is connected at the other end. The proper selection of data rate for data 183 with respect to the minimum hold time required for HPD detection, can reduce or even eliminate the occurrence of false negatives (i.e., where the source device 160 detects data at a low level and erroneously determines that no sink device 162 is detected). For example, if the signal level must remain at Low level (for example, for >1 msec) before concluding that there is no sink device 162 connected, the chances of ripple effects of data 183 through low-pass filter 184 causing false negatives can be reduced. In some embodiments, the data rate of data 183 is chosen sufficiently high to as to avoid the occurrence of false negatives. For example, in some embodiments, native RS-232 data is used, as RS-232 has a data rate sufficient to reduce or avoid the occurrence of false-negative situations. As another example, in some embodiments the bit rate is faster than the gate time. In further embodiments, the bit rate is 10 times faster than the gate time (that is for a 1 msec gate time, the bit rate is 10 kbps). In still further embodiments, the bit rate is 100 times faster than the gate time. Therefore, in some embodiments, if there is insufficient data to fill the channel at the chosen data rate, the data is sent in bursts to allow the higher data rate.

Figure 4:
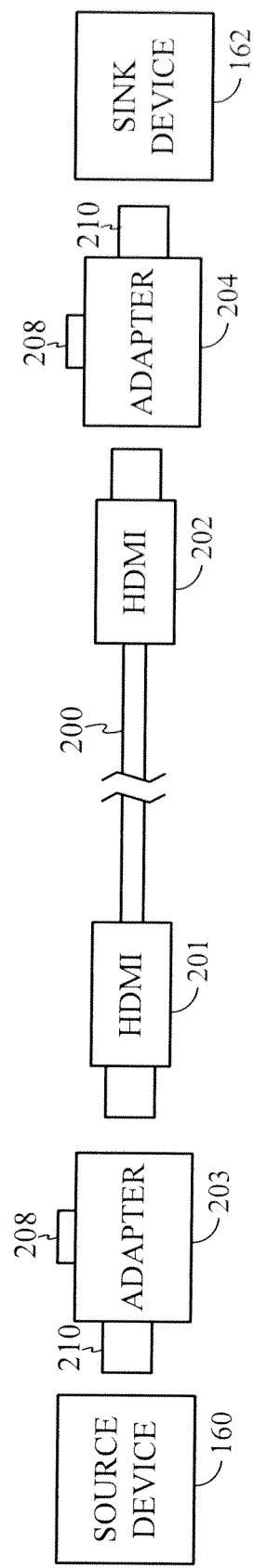
FIG. 4 is a diagram illustrating an example using adapters in accordance with one embodiment of the systems and methods described herein.

In some embodiments, low pass filters and multiplexers/demultiplexers can be integrated into HDMI source and sink devices. However, in other embodiments, separate adapters can be provided to include this functionality with legacy HDMI equipment. FIG. 4 is a diagram illustrating an example using adapters in accordance with one embodiment of the systems and methods described herein. Referring now to FIG. 4, this example shows conventional source and sink devices 160, 162 and a conventional HDMI cable 200 with standard HDMI connections at each end, 201, 202. In this example, adapters 203, 204 are provided to perform the multiplexing/demultiplexing to place the data (e.g., data 183) onto the HPD signal path at one end and extract the data from the HPD signal path at the other end. Adapters 203, 204 may also include low-pass filters to filter the signal path and provide a cleaner signal to their respective devices 160, 162. As illustrated, adapters 203, 204 include an HDMI connector 210 to connect to their respective devices 160, 162, and a female HDMI socket (not shown) to accept HDMI plugs 201, 202.

Adapters 203, 204 may also include connectors 208 to provide connectivity for the data to be communicated. For example, in one embodiment, connectors 208 are RS-232 type connectors, however, in other embodiments, other connector types can be used.

The DDC is a bi-directional signal path conforming to the I²C protocols. It includes two lines, a Serial Data Line (SDA) and a Serial Clock Line (SCL), and follows a standard protocol. Under the standard protocol, data transfer is initiated with a START bit. The START bit is detected when SDA is pulled Low while SCL remains High. When the transfer is complete, a STOP bit is sent by releasing the data line to allow it to be pulled up while the SCL is constantly high. According to I²C, the data is transmitted in 8-bit bytes, and each byte is followed by an Acknowledge. The first byte in a transmission is a Device ID, identifying the communicating device. In some embodiments, the device ID includes fields for the manufacturer, the part number and the revision, if applicable. The remainder of the bytes are memory addresses, or pointers, identifying where the data is located in memory. The communication points to a location in memory, and the device automatically increments the memory location until the STOP is encounters.

Figure 5:
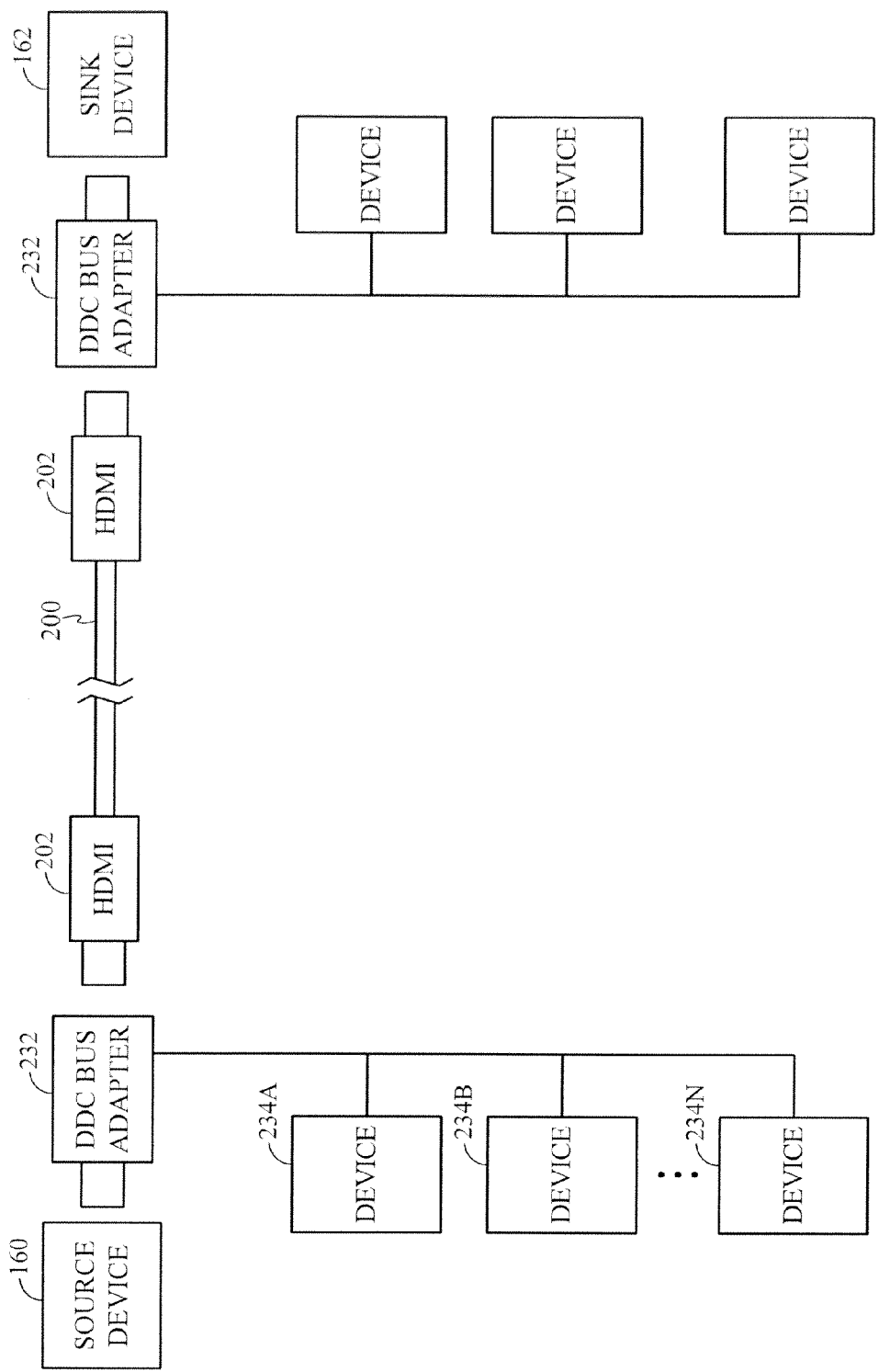
FIG. 5 is a diagram illustrating an example system using the DDC as a bus for data communication in accordance with one embodiment of the systems and methods described herein.

In various embodiments, the DDC is treated like a bus, and additional devices can be attached to the DDC for data communication. FIG. 5 is a diagram illustrating an example system using the DDC as a bus for data communication in accordance with one embodiment of the systems and methods described herein. Referring now to FIG. 5, in this example, a DDC bus adapter 232 is provided. DDC bus adapter can serve as a bridge to allow additional devices (e.g., devices 234A, 234B, . . . 234N) to connect to and communicate via the DDC signal path. Although illustrated in this example as a separate adapter, some or all of the functionality of adapter 232 can be integrated into source and sink devices 160, 162.

With conventional HDMI, the source and sink devices 160, 162 are identified by the device IDs A0 and A1. In some embodiments, the additional devices connected to the DDC are given their own unique IDs, so that they can be identified and addressed for network communications. In some embodiments, the DDC bus adapter 232 can convert data from one format to another to facilitate communications across the DDC. For example, where one or more of devices 234A, 234B, . . . 234N are other than I²C devices, DDC bus adapter 232 can perform the necessary protocol conversion to convert the data from devices 234A, 234B, . . . 234N to the I²C protocol. As a further example, where devices 234A, 234B, . . . 234N are RS-232 devices, the DDC bus adapter 232 can perform the necessary protocol conversion to convert the RS-232 data from devices 234A, 234B, . . . 234N to the I²C protocol.

Figure 6:
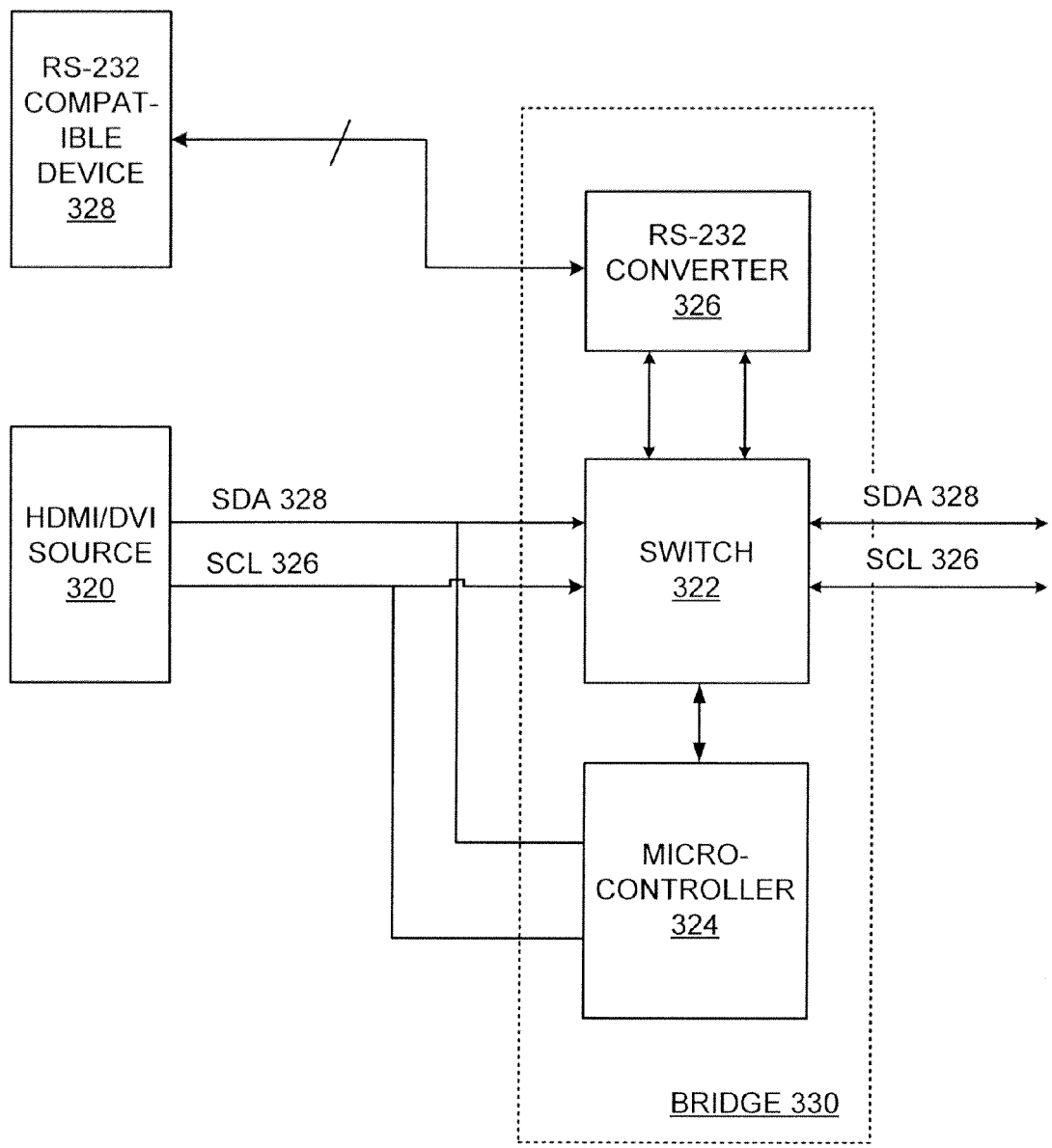
FIG. 6 is a simplified block diagram illustrating a system for embedding or overlaying external data onto the DDC signal path in accordance with one embodiment of the systems and methods described herein.

FIG. 6 is a simplified block diagram illustrating a system for embedding or overlaying external data onto the DDC signal path in accordance with one embodiment of the systems and methods described herein. Referring now to FIG. 6, in the illustrated example, the external data that is embedded is RS-232 data sent to/from a device 328 having an RS-232 data interface. After reading this description, it will become apparent to one of ordinary skill in the art how the invention can be implemented to embed data from devices having other than an RS-232 interface using other interface standards or protocols.

In this example, a bridge 330 is provided, and the bridge 330 is used to multiplex the RS-232 clock and data onto the DDC clock and data lines of the HDMI interface. This example bridge 330 includes an RS-232 converter 326, a switch 322, and a microcontroller 324. The functionality of bridge 330 can be implemented in a separate adapter to be plugged into an HDMI device (for example, as depicted in and described with reference to FIG. 4), or some or all of the functionality of bridge 330 can be included in the HDMI device (whether source or sink) itself.

When device 328 has data to send across the HDMI link, device 328 sends that data to bridge 330. If the data is in an incompatible format, it is converted to a format compatible with bridge 330 hardware. For example, a converter 326 may be provided in some embodiments to convert RS-232 data into I²C format for compatibility with the DDC signal paths. In some embodiments, switch 322 is implemented as a complex programmable logic device (CPLD), although other devices such as processors, field programmable gate arrays (FPGAs) can be used as well. When microcontroller 324 senses an idle condition on DDC lines SDA 328, SDA 326, microcontroller 324 sends a signal to switch 322, instructing switch 322 to inject the external data onto the DDC lines SDA 328, SDA 326. For receive operations, external data is received by switch 322, converted to RS-232 format and sent to the RS-232 compatible device 328. In this example, the bridge 330 can be configured to treat the DDC like a bus. Bridge 330 can assign all external devices a bus ID, and allow them to connect through the bridge 330 onto the DDC. The ID can be used at the other end to identify the data as belonging to a particular device and extract and properly route the data according to its ID.

Although bridge 330 is illustrated in this example as being at the source HDMI device 320, a similar bridge can be provided at a corresponding sink HDMI device. Additionally, although bridge 330 is illustrated as multiplexing data onto the DDC signal lines, a similar arrangement can be used to modulate or multiplex the data onto the HPD signal line.

Although not shown in FIG. 6, one of ordinary skill in the art reading this description would understand that appropriate receivers and drivers (or transmitters) will be included with the bridge 330 to receive the input data signals and to transmit the data across the interface. Such receivers can include separate receiver circuits or components or can be implemented as the gates, transistors or other input components on the switch 322, microcontroller 324 or converter 326 modules. Similarly, the transmitters or drivers can include circuits or components or can be implemented using the output gates, transistors, or other elements of the switch 322, microcontroller 324 or converter 326 modules. Likewise, one of ordinary skill in the art would similarly understand that receivers and drivers would also be included in embodiments using a modulator, mixer or other module for multiplexing or embedding the data onto the HDMI signal path(s).

Figure 7:
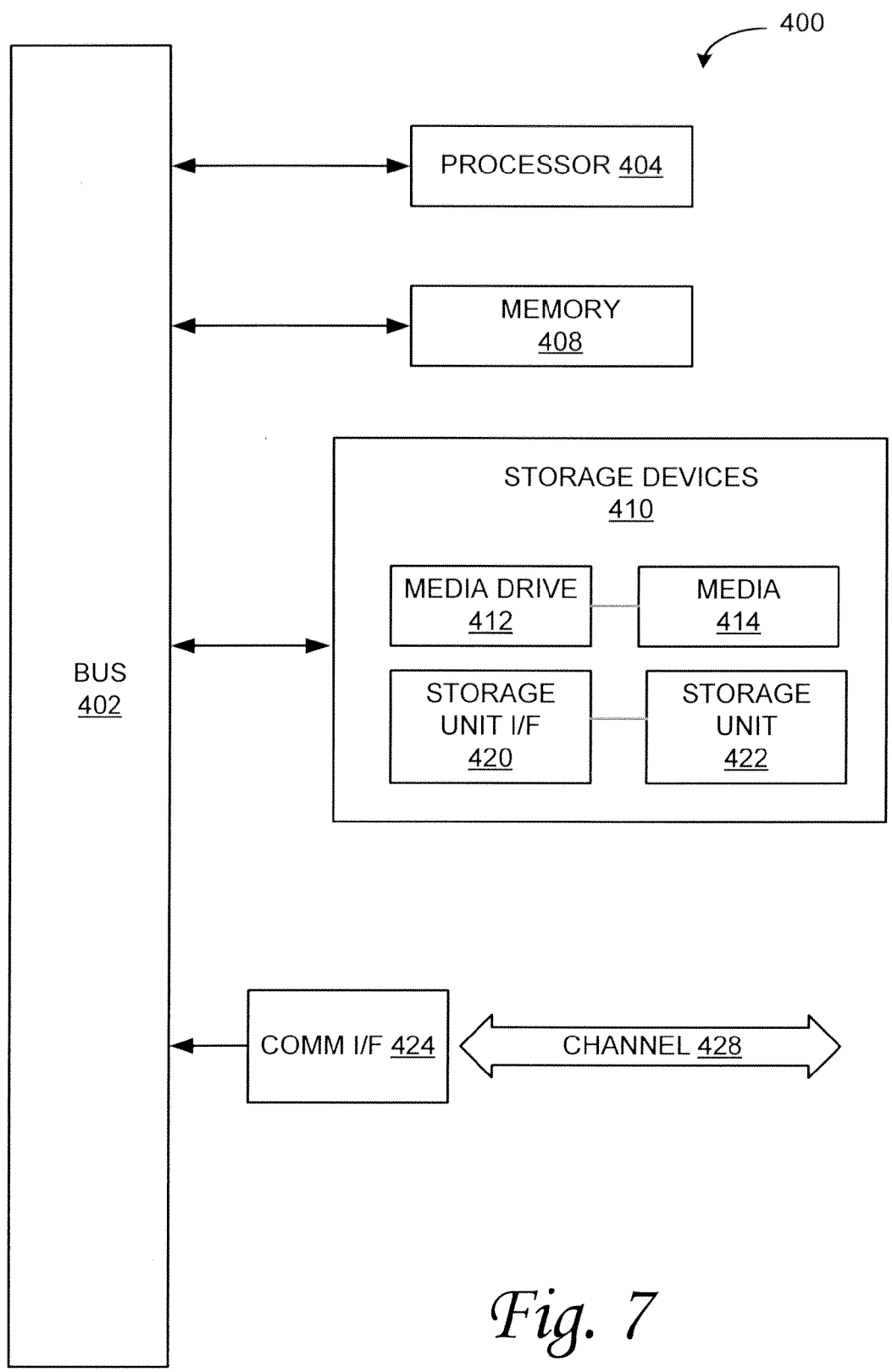
FIG. 7 illustrates an example computing module that may be used in implementing various features of embodiments of the invention.

There are a number of applications for the systems and methods described herein, where it may be desired to share data in addition to standard HDMI or DVI data between HDMI or DVI devices over the HDMI or DVI interface. By way of example only, many modern operating rooms include a mobile imaging technology that allows a portable X-Ray, MRI or like device to be brought into the OR, hooked up, used to obtain the desired image(s) and brought out. In such an environment, such imaging devices typically transmit their images using an HDMI, DVI or other video interface. It may be desirable to allow the portable imaging device to communicate other data and information to other devices in the OR, or to computer devices managing the OR environment. For example, it may be desired that the imaging device announce its presence when it is hooked up in the OR, and to transmit data regarding its capability to a central processor. It may also be desired that the imaging device be controlled by the central processor. The central processor, recognizing that an imaging device is now present in the OR, can take whatever steps may be necessary to manage the imaging process and the OR. For example, sensitive OR equipment may need to be shut down before operation of an interference causing device such as an MRI device. Accordingly, data announcing the MRI device and its capabilities (in addition to the HDMI image data) can be sent over the HDMI interface using the systems and methods described herein. Likewise, control data from the central processor to the MRI device to control operation of the MRI device can also be sent over the HDMI interface using the systems and methods described herein. This is only one example of the numerous applications for sending external data over an HDMI interface.

Where components or modules of the invention are implemented in whole or in part using software, in one embodiment, these software elements can be implemented to operate with a computing or processing module capable of carrying out the functionality described with respect thereto. One such example computing module is shown in FIG. 7. Various embodiments are described in terms of this example-computing module 400. After reading this description, it will become apparent to a person skilled in the relevant art how to implement the invention using other computing modules or architectures.

Referring now to FIG. 7, computing module 400 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 400 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 400 might include, for example, one or more processors, controllers, control modules, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing module 400 or to communicate externally.

Computing module 400 might also include one or more memory modules, simply referred to herein as main memory 408. For example, preferably random access memory (RAM) or other dynamic memory, might be used for storing information and instructions to be executed by processor 404. Main memory 408 might also be used for storing temporary variables or other intermediate information during execution of instructions to be executed by processor 404. Computing module 400 might likewise include a read only memory ("ROM") or other static storage device coupled to bus 402 for storing static information and instructions for processor 404.

The computing module 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a floppy disk drive, a magnetic tape drive, an optical disk drive, a CD or DVD drive (R or RW), or other removable or fixed media drive might be provided. Accordingly, storage media 414 might include, for example, a hard disk, a floppy disk, magnetic tape, cartridge, optical disk, a CD or DVD, or other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing module 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory module) and memory slot, a PCMCIA slot and card, and other fixed or removable storage units 422 and interfaces 420 that allow software and data to be transferred from the storage unit 422 to computing module 400.

Computing module 400 might also include a communications interface 424. Communications interface 424 might be used to allow software and data to be transferred between computing module 400 and external devices. Examples of communications interface 424 might include a modem or soft modem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a phone line, a cellular link, an RF link, an optical link, a network interface, a local or wide area network, and other wired or wireless communications channels.

In his document, the terms "computer program medium" and "computer usable medium" are used to generally refer to media such as, for example, memory 408, storage unit 420, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 400 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow flowcharts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A multiplexer comprising:
a first interface configured to receive one or more video or video-related High-Definition Multimedia Interface (HDMI) or Digital Visual Interface (DVI) signals for transmission over a respective one of an HDMI or DVI interface;
a second interface configured to receive external data from a data source, the external data being intended for transmission over the HDMI or DVI interface, the external data being non-HDMI and non-DVI signals that are non-video or non-video-related;
a data multiplexing device having inputs coupled to the first and second interfaces, having an output, and being configured to multiplex the external data with information on one or more signal paths of the HDMI or DVI interface by converting the external data to a format compatible with the one or more signal paths, the one or more signal paths comprising at least one of a Display Data Channel (DDC) or a Hot Plug Detection (HPD) signal line; and
a transmitter coupled to the output of the data multiplexing device, configured to transmit the external data across the HDMI or DVI interface.

2. The multiplexer of claim 1, wherein the data multiplexing device comprises a switch having a first input to receive the one or more HDMI or DVI signals, a second input configured to receive external data from a data source, and a switch configured to switch between the HDMI or DVI signals and the external data, to time division multiplex the external data across the HDMI or DVI interface.

3. The multiplexer of claim 2, further comprising a microcontroller coupled to the switch and configured to monitor the signal paths of the HDMI or DVI interface and to send a signal to the switch when the microcontroller senses an idle condition on the HDMI or DVI interface, instructing the switch to embed the external data onto the HDMI or DVI interface.

4. The multiplexer of claim 1, wherein the data multiplexing device comprises a modulator configured to modulate the external data onto the one or more signal paths of the HDMI or DVI interface.

5. The multiplexer of claim 4, wherein the modulator comprises a mixer.

6. The multiplexer of claim 4, further comprising a low-pass filter coupled between the modulator and a source or sink device.

7. The multiplexer of claim 1, wherein the external data comprises an ID-tag identifying the device generating the external data.

8. The multiplexer of claim 1, wherein the data multiplexing device comprises a bridge to convert the external data to a format compatible with one of a DDC or an HPD signal line of the HDMI or DVI interface.

9. A multiplexer for communicating external data between devices across a video interface, comprising:
a first input to receive video or video-related data from a first video device;
a second input to receive the external data for transmission across the video interface, wherein the external data and the video or video-related data are disparate types of data, the external data comprising non-video or non-video-related data and is in a format incompatible with the video interface; and
control logic configured to inject the external data onto the video interface for transmission across the video interface, wherein prior to injecting the external data onto the video interface for transmission across the video interface, the external data is converted to a format compatible with one of a Display Data Channel (DDC) or a Hot Plug Detection (HPD) signal line of the video interface.

10. The multiplexer of claim 9, wherein the control logic comprises a controller and switching logic, wherein the controller is configured to detect an idle condition on the video interface and to control the switching logic.

11. The multiplexer of claim 10, wherein the controller controlling the switching logic comprises instructing the switching logic to switch the external data onto the video interface during a detected idle condition.

12. The multiplexer of claim 10, wherein the controller is further configured to monitor the video interface for the presence of external data from a device across the video interface and to control the switching logic to extract sensed external data from the device across the video interface.

13. The multiplexer of claim 9, wherein the control logic comprises a modulator, wherein the modulator is configured to modulate the external data onto the video interface.

14. The multiplexer of claim 13, wherein the control logic further comprises a demodulator, wherein the demodulator is configured to extract external data from the video interface.

15. A video system, comprising
a first video device configured to send video or video-related data across a video interface;
a second video device configured to receive the video or video-related data sent by the first device across the video interface;
a third device configured to communicate external data, wherein the external data comprises non-video or non-video-related data and is in a format incompatible with the video interface;
a multiplexer coupled to the video interface and coupled to the third device, the multiplexer comprising:
a first input to receive the video or video-related data from the first video device;
a second input to receive the external data from the third device for transmission across the video interface; and
control logic configured to inject the external data onto the video interface for transmission across the video interface, wherein prior to injecting the external data onto the video interface for transmission across the video interface, the external data is converted to a format compatible with one of a Display Data Channel (DDC) or a Hot Plug Detection (HPD) signal line of the video interface.

16. The video system of claim 15, wherein the control logic comprises a controller and switching logic, wherein the controller is configured to detect an idle condition on the video interface and to control the switching logic.

17. The video system of claim 16, wherein the controller controlling the switching logic comprises instructing the switching logic to switch the external data onto the video interface during a detected idle condition.

18. The video system of claim 16, wherein the controller is further configured to monitor the video interface for the presence of external data from a device across the video interface and to control the switching logic to extract sensed external data from the device across the video interface.

19. The video system of claim 15, wherein the control logic comprises a modulator, wherein the modulator is configured to modulate the external data onto the video interface.

20. The video system of claim 19, wherein the control logic further comprises a demodulator, wherein the demodulator is configured to extract external data from the video interface.

21. The video system of claim 15, wherein the video interface comprises an HDMI or DVI video interface.

22. The video system of claim 15, wherein the third device is integrated with the first or second device.

23. The video system of claim 15, wherein the first device comprises a medical instrument having an image sensor and the second device comprises a video display.

24. A multiplexer comprising:
a first interface configured to receive one or more High-Definition Multimedia Interface (HDMI) or Digital Visual Interface (DVI) signals for transmission over a respective one of an HDMI or DVI interface;
a second interface configured to receive external data from a data source, the external data being intended for transmission over the HDMI or DVI interface, the external data being non-HDMI and non-DVI signals;
a data multiplexing device having inputs coupled to the first and second interfaces, and having an output, and being configured to multiplex the external data with information on one or more signal paths of the HDMI or DVI interface; and
a transmitter coupled to the output of the data multiplexing device, configured to transmit the external data across the HDMI or DVI interface, wherein the information comprises Display Data Channel (DDC) information, and wherein multiplexing the external data with information on one or more signal paths of the HDMI or DVI interface comprises combining the external data with the DDC information on a DDC of the HDMI or DVI interface.

25. A multiplexer comprising:
a first interface configured to receive one or more High-Definition Multimedia Interface (HDMI) or Digital Visual Interface (DVI) signals for transmission over a respective one of an HDMI or DVI interface;
a second interface configured to receive external data from a data source, the external data being intended for transmission over the HDMI or DVI interface, the external data being non-HDMI and non-DVI signals;
a data multiplexing device having inputs coupled to the first and second interfaces, and having an output, and being configured to multiplex the external data with information on one or more signal paths of the HDMI or DVI interface; and
a transmitter coupled to the output of the data multiplexing device, configured to transmit the external data across the HDMI or DVI interface, wherein multiplexing the external data with information on one or more signal paths of the HDMI or DVI interface comprises at least one of the following:
embedding the external data on a Hot Plug Detect (HPD) signal line of the HDMI or DVI interface;
embedding the external data with an HDMI video stream for transmission across the HDMI interface by embedding the external data in a blanking portion of the HDMI video stream; and
decoding video data in the HDMI or DVI signals, embedding the external data into the video data, reassembling an HDMI or DVI video frame with the video data and the external data, and encoding the reassembled video frame for transmission.

26. A multiplexer for communicating external data between devices across a video interface, comprising:
a first input to receive video or video-related data from a first video device;

a second input to receive the external data for transmission across the video interface, the external data and the video or video-related data being disparate types of data; and control logic configured to inject the external data onto the video interface for transmission across the video interface, wherein the video or video-related data comprises Display Data Channel (DDC) information, and wherein injecting the external data onto the video interface for transmission across the video interface comprises combining the external data with the DDC information on a DDC of the video interface.

27. A multiplexer for communicating external data between devices across a video interface, comprising:

a first input to receive video or video-related data from a first video device;

a second input to receive the external data for transmission across the video interface, the external data and the video or video-related data being disparate types of data; and control logic configured to inject the external data onto the video interface for transmission across the video interface, wherein the video or video-related data comprises High-Definition Multimedia Interface (HDMI) or Digital Visual Interface (DVI) data, and wherein injecting the external data onto the video interface for transmission across the video interface comprises at least one of the following:

embedding the external data on a Hot Plug Detect (HPD) signal line of the video interface;

embedding the external data with an HDMI video stream for transmission across the video interface by embedding the external data in a blanking portion of the HDMI video stream; and decoding the video data, embedding the external data into the video data, reassembling a video frame with the video data and the external data, and encoding the reassembled video frame for transmission.

* * * * *